July 26, 1955 G. E. WRIGHT 2,713,709
MACHINE FOR PROGRESSIVE MULTIPLE-STAGE MOLDING
Filed Oct. 25, 1952 6 Sheets-Sheet 1

INVENTOR.
GEORGE E. WRIGHT
BY Knox & Knox
AGENTS

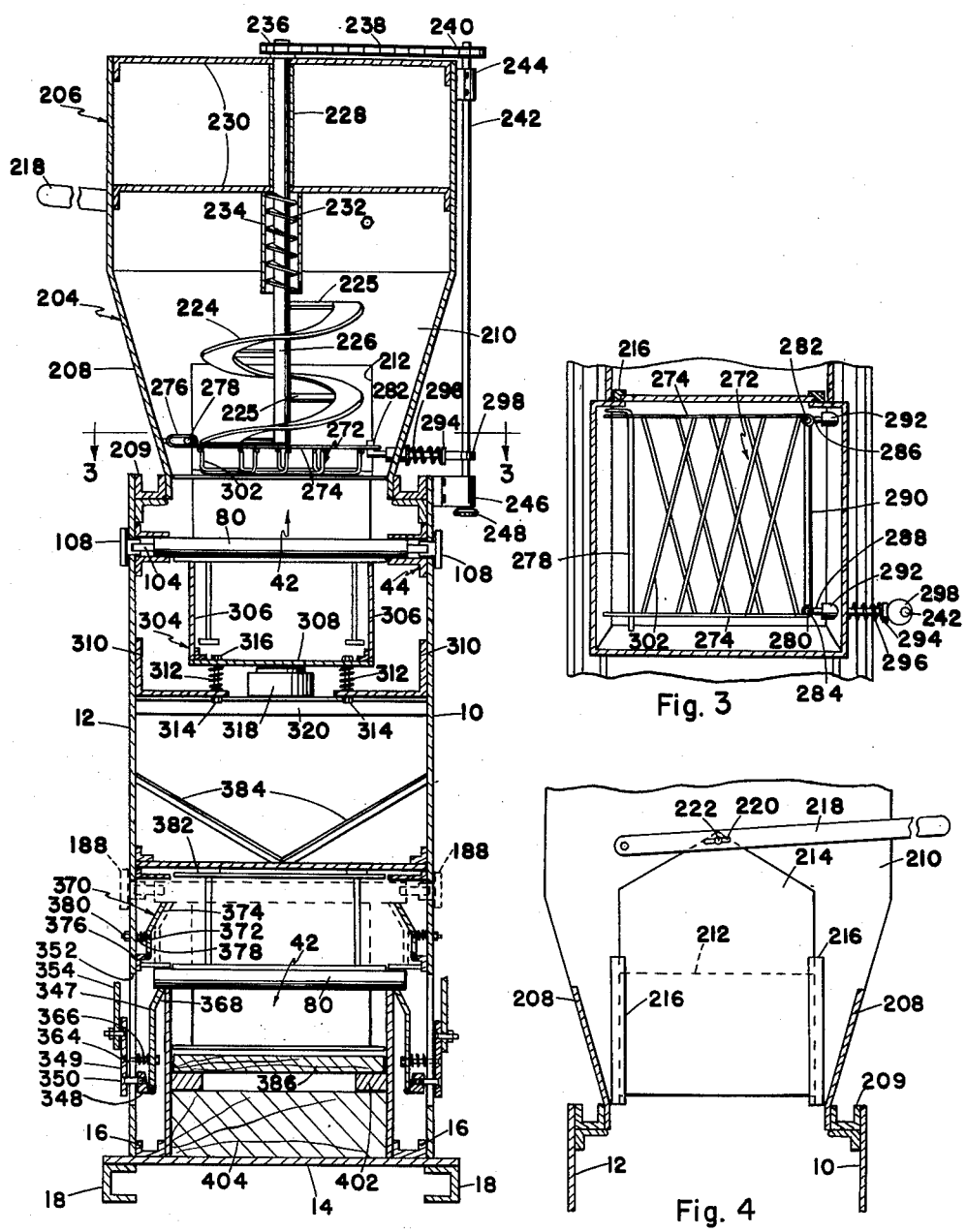

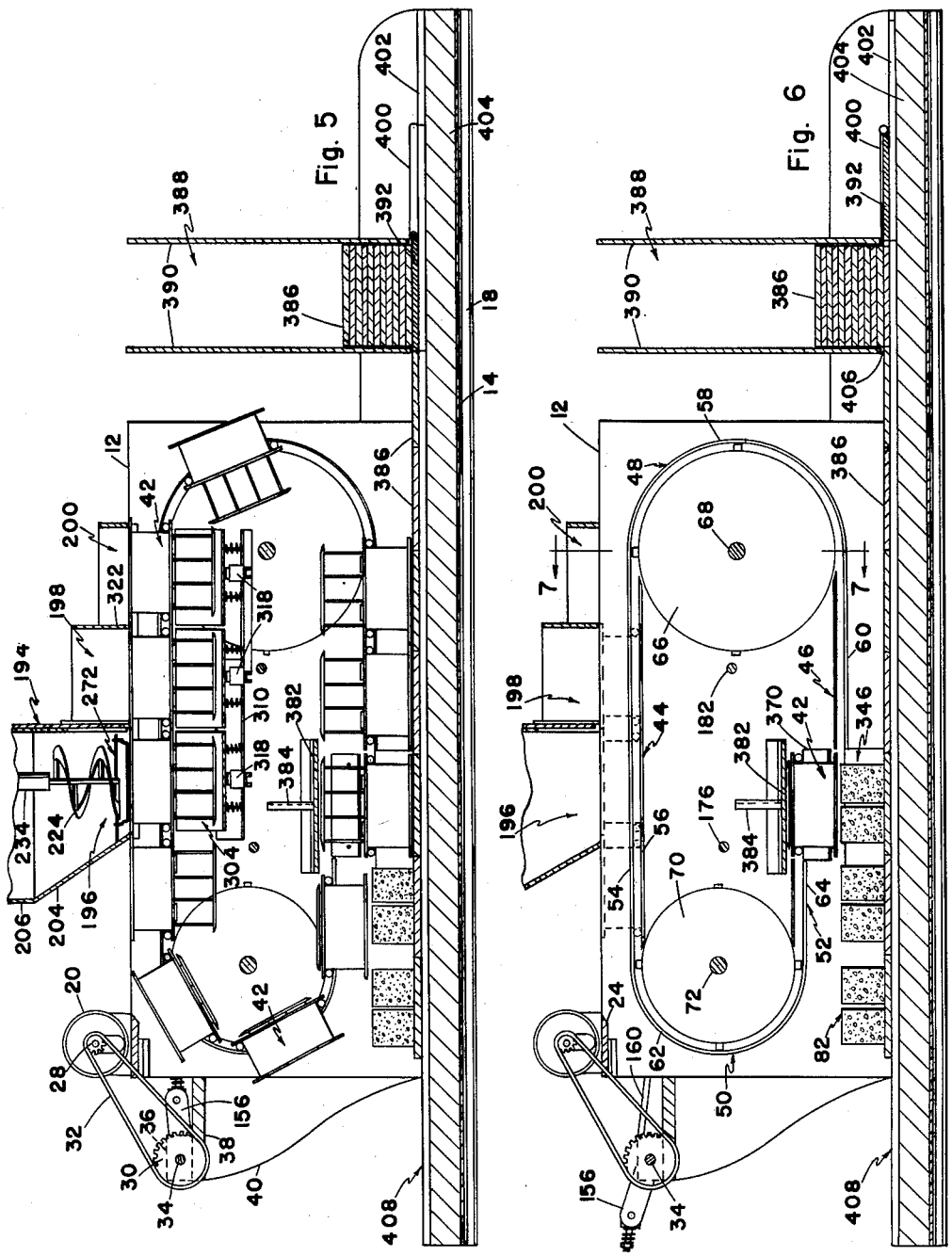

INVENTOR.
GEORGE E. WRIGHT
BY
Knox & Knox
AGENTS

July 26, 1955          G. E. WRIGHT                2,713,709
          MACHINE FOR PROGRESSIVE MULTIPLE-STAGE MOLDING
Filed Oct. 25, 1952                          6 Sheets-Sheet 5

*INVENTOR.*
GEORGE E. WRIGHT
BY
*Knox & Knox*
AGENTS

July 26, 1955 G. E. WRIGHT 2,713,709
MACHINE FOR PROGRESSIVE MULTIPLE-STAGE MOLDING
Filed Oct. 25, 1952 6 Sheets-Sheet 6

*INVENTOR.*
GEORGE E. WRIGHT
BY
*Knox & Knox*
AGENTS

United States Patent Office 2,713,709
Patented July 26, 1955

2,713,709

MACHINE FOR PROGRESSIVE MULTIPLE-STAGE MOLDING

George E. Wright, Cardiff-by-the-Sea, Calif.

Application October 25, 1952, Serial No. 316,896

9 Claims. (Cl. 25—100)

The present invention relates generally to a molding machine and more particularly to an automatic molding machine for making building blocks and the like.

The primary object of this invention is to provide a molding machine which will automatically and continuously produce molded articles such as bricks, blocks or the like from concrete or other moldable material.

Another object of this invention is to provide a molding machine of the type described utilizing a plurality of molds which have the required internal configuration to produce molded articles of various sizes and forms, articles of one-half regular mold size, and even articles of different sizes and forms during a single uninterrupted run.

Another object of this invention is to provide a molding machine in which the molds are progressively advanced along a closed path passing a filling station and a discharge station, said closed path having horizontal upper and lower portions and curved ends joining those portions so that the molds are automatically inverted while passing from the upper portion to the lower portion, thus permitting a simplified ejection process for the molded articles.

Another object is to provide a molding machine in which the molds are independently controlled at both the filling and discharge stations but are movable collectively or as a group between said stations, said movement being controlled by reciprocable and intermittently actuated ratchet means.

Another object is to provide a molding machine having mold filling means including a hopper for initially receiving the molding material, said molding material flowing directly from the hopper into each mold advanced therebeneath, means being provided to vibrate said molding material to ensure even density thereof, other means being provided to agitate the molding material to prevent packing or clogging within the hopper.

Yet another object of this invention is to provide a molding machine having means for discharging molded articles from the mold at the discharge station, the lower portion of the closed path being broken at this station and continued at a higher level so that when the molds are lifted from the lower level to the higher level, the molded articles will be ejected by means contained within the mold and deposited on one of a series of pallets advancing beneath said molds in inverted position.

Another object is to provide a molding machine having means to feed and advance the pallets in sequence timed with the intermittent movement of the molds and to remove said pallets to a position remote from the discharge station after receiving the molded articles thereon.

A further object of this invention is to provide a molding machine in which the various mechanisms, for example, the mold filling means, the vibrating and compacting means, the discharging means and the pallet feeding means are operated in sequence timed with the intermittent advancement of the molds along the closed path so that the complete process is accomplished automatically and efficiently, requiring no attention other than maintaining a supply of molding material within the hopper and the removal of the finished molded articles.

Another object of this invention, ancillary to the preceding objects, is to teach the best known mode of implementing the principles of the invention in carrying the invention into actual practice.

Finally, it is an object to provide a molding machine of the aforementioned character which is simple, safe and convenient to operate, and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure and wherein similar characters of reference indicate similar or identical elements and portions throughout the specification and throughout the views of the drawings, and in which:

Fig. 2 is an enlarged vertical sectional view taken on the line 2—2 of Fig. 1.

Fig. 3 is a fragmentary horizontal sectional view taken on the line 3—3 of Fig. 2.

Fig. 4 is an enlarged fragmentary vertical sectional view taken on the line 4—4 of Fig. 1.

Fig. 5 is a longitudinal sectional view of the molding machine illustrating the molds in position for the filling and discharge operation, portions of the mechanism being omitted for clarity.

Fig. 6 is a longitudinal sectional view of the molding machine illustrating a mold in the discharged position, the remaining molds and portions of the mechanism being omitted for clarity.

Figure 1:
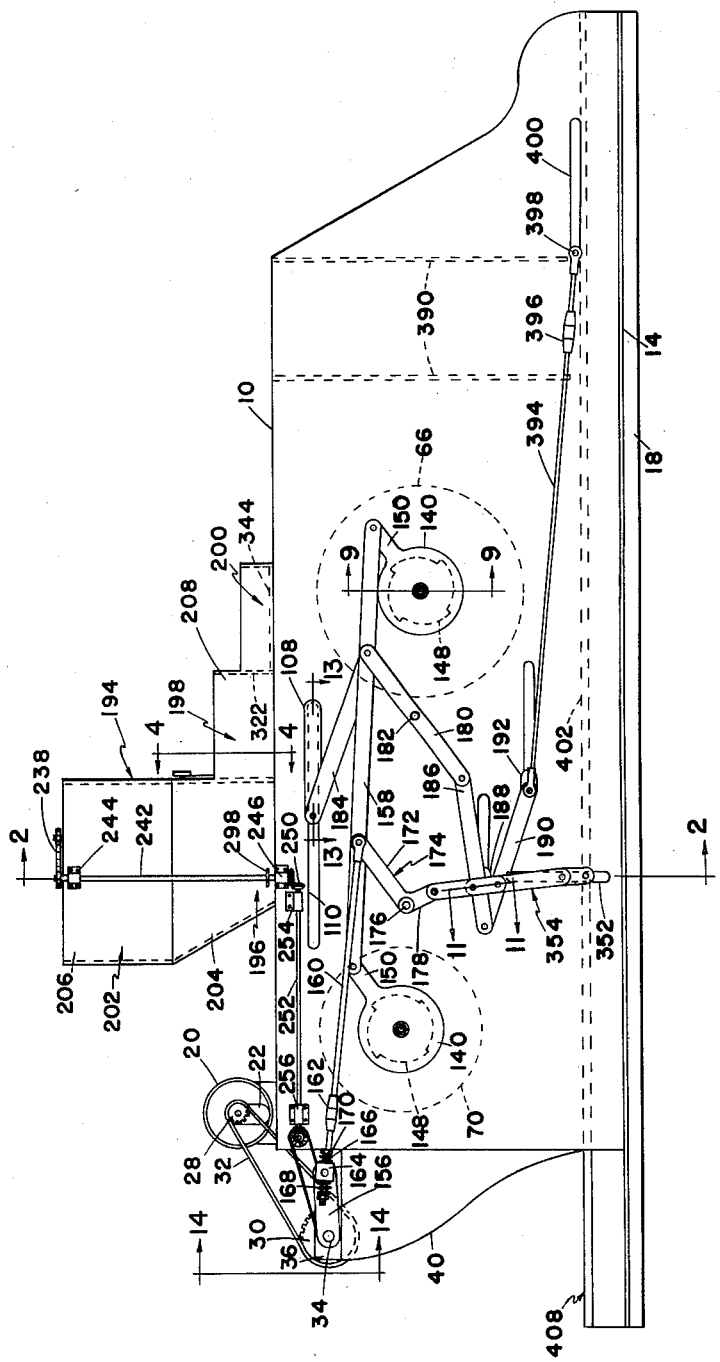
Fig. 1 is a side elevation view of the molding machine.

Referring now to the drawing in detail, the molding machine comprises two vertical sides 10 and 12 secured to a base plate 14 and reinforced by means of channel members 16, said base plate being supported by two base members 18.

The machine is powered by a motor 20 having a reduction gear box 22, said motor being attached to a platform 24 which also serves to brace the upper portions of the sides 10 and 12 in correct spaced relationship. The driving shaft 26 of the motor 20 is provided with a gear 28 driving a gear 30 by means of a chain 32, the gear 30 being secured to a shaft 34 rotatably mounted in two bearing blocks 36 which are carried on a support plate 38 mounted upon the sides 10 and 12 and reinforced by means of gussets 40. It should be noted at this point that all of the various mechanisms are actuated either directly or indirectly by the shaft 34, thus providing the necessary synchronism.

The molds 42, which will later be described in detail, are moved in a closed path formed by an upper track 44, a lower track 46, a curved end track 48 joining said upper and lower tracks and a curved end track 50 joining the upper track and the raised portion 52 of the lower track 46, all track members being secured to the inner surfaces of the sides 10 and 12. The upper track 44 comprises an outer rail 54 and an inner rail 56, said outer rail being extended to form the outer curved rail 58 of the end track 48. The outer curved rail is further continued to form the outer rail 60 of the lower track 46. The remaining end of the outer rail 54 is extended to form the outer curved rail 62 of the end track 50 which is further extended to form the outer rail 64 of the raised track 52. The inner rail of the end track 48 is formed by periphery of a wheel 66 secured to a cross shaft 68 which is rotatably mounted in the sides 10 and 12. The inner rail of the end track 50 is formed by the periphery of a wheel 70 similar to, but smaller than, the wheel 64 and the wheel 70 is secured to a cross shaft 72 rotatably mounted on the sides 10 and 12.

Figure 19:
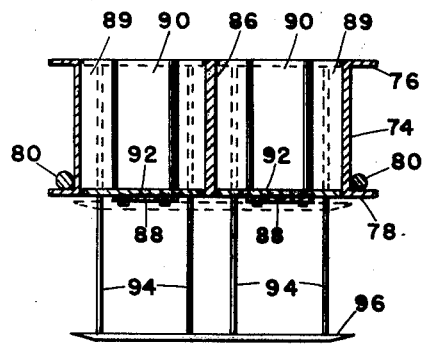
Fig. 19 is a sectional view taken on the line 19—19 of Fig. 17.
Figure 22:
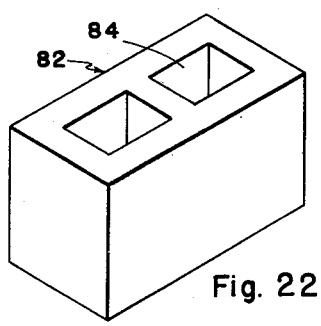
Fig. 22 is an isometric view of a block produced by the mold illustrated in Figs. 17, 18 and 19.

Each of the molds 42 comprises a frame 74, substantially square in plan form, having an upper flange 76 and a lower flange 78, both of said flanges extending outwardly from said frame. Two trunnions 80 are secured to the lower flange 78, said trunnions extending from both sides of the mold to engage in the tracks of the closed path. The particular mold illustrated is adapted for producing concrete building blocks 82 having hollow cores 84 as illustrated in Fig. 22. However, it should be understood that the use of the mold is not limited to the manufacture of this particular type of block. Further, the internal dimensions of the frame 74 are such that the internal structure may be arranged to produce all the sizes of concrete blocks commonly in use in the building trade with a minimum of wasted space, that is, the dimensions of standard concrete blocks now in use are such that various sizes of such blocks may be geometrically arranged to utilize the maximum space within the mold. The internal structure of the particular mold described herein comprises a web 86 dividing the mold into two equal portions and two transverse plates 88 are attached to the outer surface of the lower flange 78 so as to be centrally located over the two cavities 89 formed by the web 86. Each transverse plate 88 carries two cores 90 secured thereon to form the hollow cores 84 in the concrete block 82. The bottom of each cavity 89 is closed by an ejector plate 92 which is provided with suitable holes to fit over the cores 90, said ejector plate being a close sliding fit within the cavity to prevent leakage of the molding material during the filling operation. Each ejector plate 92 is further provided with four or more legs 94 extending outwardly from the mold, two of the legs from each ejector plate being secured to a common ejector bar 96 as illustrated in Fig. 19.

Figure 20:
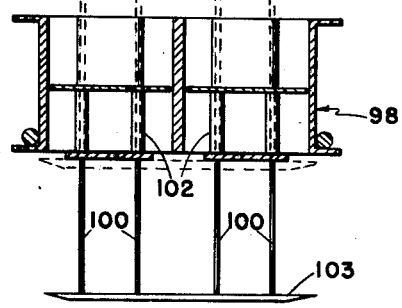
Fig. 20 is a longitudinal sectional view of a mold adapted to produce blocks of approximately one-half the thickness of those produced by the mold illustrated in Fig. 19.
Figure 21:
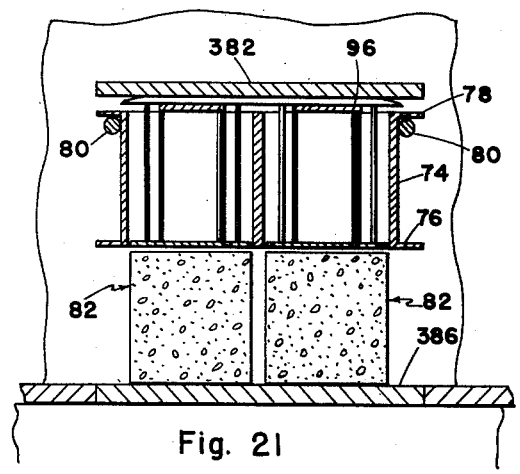
Fig. 21 is an enlarged fragmentary sectional view of a mold in the discharged position showing the molded articles resting on a pallet.

The mold 98 illustrated in Fig. 20 is adapted for producing blocks similar to, but approximately half the thickness of the block 82, said mold being similar in many respects to the mold 42 except that the ejector plates 92 are provided with extended legs 100 for reasons which will later be explained. The legs 100 are slidably fitted into spacers 102 which are secured to the transverse plates 88, and which serve to retain the ejector plates at the correct position within the mold.

Figure 13:
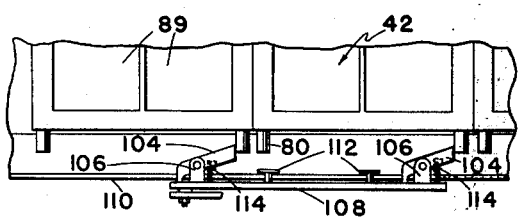
Fig. 13 is an enlarged fragmentary sectional view taken on the line 13—13 of Fig. 1.
Figure 14:
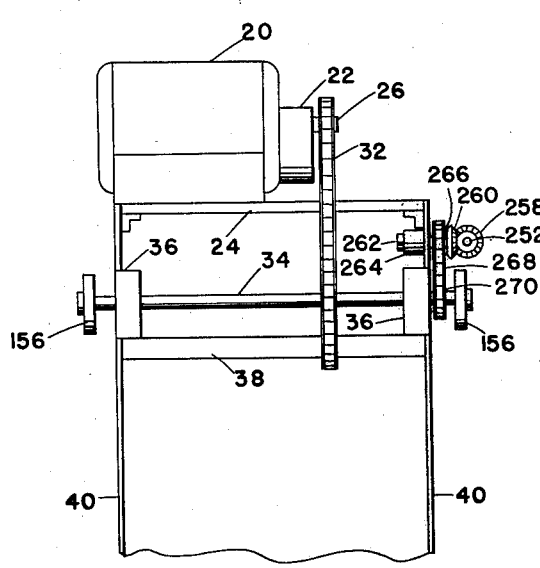
Fig. 14 is an enlarged fragmentary end elevation viewed in the direction of arrows 14—14 in Fig. 1.
Figure 16:
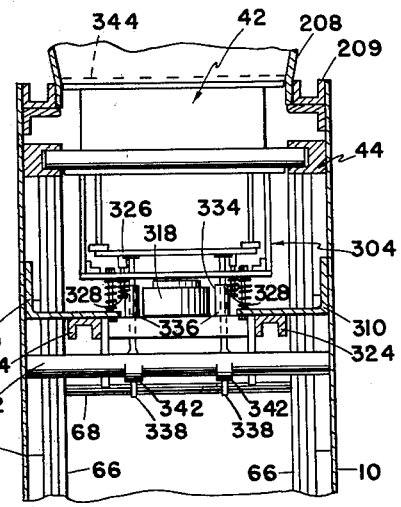
Fig. 16 is a sectional view taken on the staggered line 16—16 of Fig. 15.

The molds are advanced along the upper track by means of a rachet mechanism comprising two pawls 104 pivotally mounted on brackets 106 which are secured to a slide bar 108, said slide bar being slidably mounted in a slot 110 in the side 10 and retained by means of retaining pins 112. The pawls 104 are tensioned inwardly by means of springs 114, the distance between said pawls being equal to the length of a mold 42 so that the pawls engage with the trunnions 80 of two adjacent molds as illustrated in Fig. 13. As the slide bar 108 is moved along the slot 110 the molds are advanced by the pawls, while on the return stroke of the slide bar, said pawls pivot against the spring tension until becoming engaged with the subsequent pair of trunnions 80.

It will be obvious that the tracks comprising the closed path and the various means for advancing the molds must be duplicated at either side of the device to ensure even movement of the molds.

The molds are further advanced along the lower track and the raised portion of the lower track by rachet mechanisms similar to those previously described, but obviously with the pawls operative in the opposite direction to those in the upper track.

Figure 8:
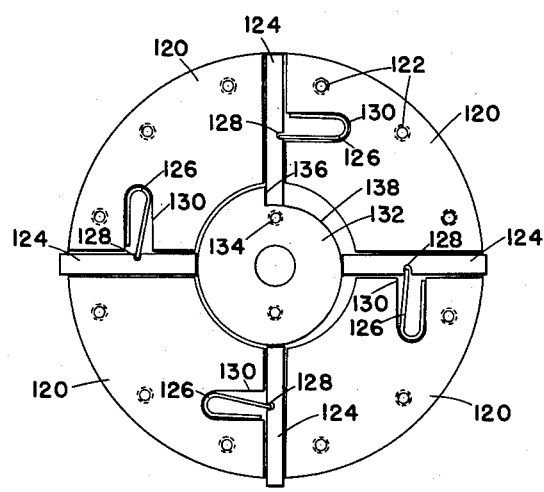
Fig. 8 is a sectional view taken on the line 8—8 of Fig. 7.

The molds are carried around the curved end track 50 by means of mechanism contained within the wheels 70, each of which comprises a face plate 116 and a back plate 118 which are separated by means of four similar spacer segments 120, the whole being secured as a unit by means of screws 122. The spacer segments 120 are positioned so that the intervening spacers each provide a sliding fit for one of four tongues 124 which are tensioned inwardly by means of springs 126 engaging with notches 128 in said tongues and retained in recesses 130 within the spacer segments as illustrated in Fig. 8. The face plate 116 is secured to the cross shaft 72, while the spacer segments 120 and the back plate 118 are cut away to provide clearance for a cam 132 which is secured to the side 10 by means of bolts 134. The cam 132 is provided with a step 136 so that each tongue 124 will fall into the retracted position as the wheel 70 rotates around said cam. The contoured portion 138 of the cam is formed so that each tongue will be lifted into the extended position in one-half of a turn.

As each mold is advanced along the raised track 52, the trunnion 80 will be engaged by one of the tongues 124 and as the wheel rotates the mold will be lifted to the upper track turning to the upright position while doing so. The tongue 124 will then drop into the retracted position leaving the mold free to be advanced along the upper track until said mold is engaged by one of the pawls 104. While passing from the upper track to the lower track, the molds are advanced by means of a mechanism in the wheels 66 similar to that described for the wheels 70 although the tongues within the wheel 66 rise into the retracted position at the lowest point during rotation so that the molds will be free to advance along the lower track. The necessity for retraction of the tongues 124 will be readily understood when it is noted that the wheels 66 and 70 each rotate through 90° while the molds advance a single mold length. The circumferential speed of the wheel 66 is greater than that of wheel 70 and considerably greater than the rectilineal speed of the molds in the various tracks. Therefore the tongues 124 must be retracted immediately after the corresponding mold has been moved onto either the upper or lower track, in order to prevent interference of the tongues with the rectilinear motion of the molds.

Figure 7:
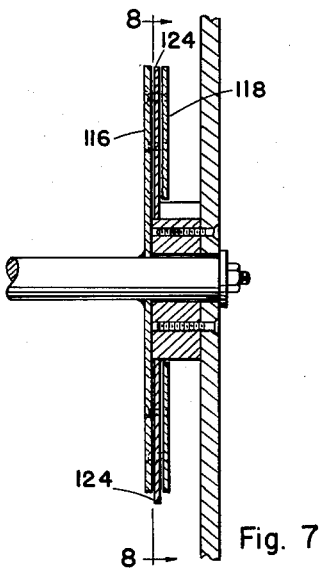
Fig. 7 is an enlarged fragmentary sectional view taken on the line 7—7 of Fig. 6.
Figure 10:
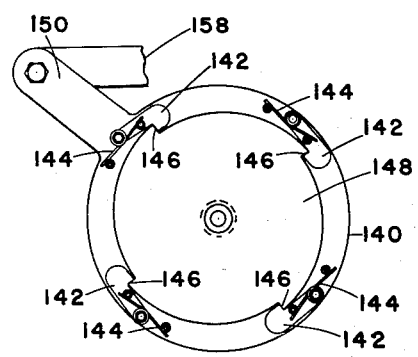
Fig. 10 is a sectional view taken on the line 10—10 of Fig. 9.
Figure 9:
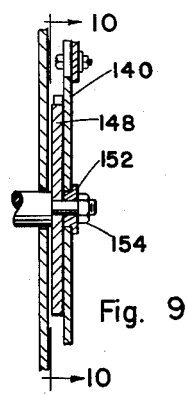
Fig. 9 is an enlarged sectional view taken on the line 9—9 of Fig. 1.
Figures 11, 12:
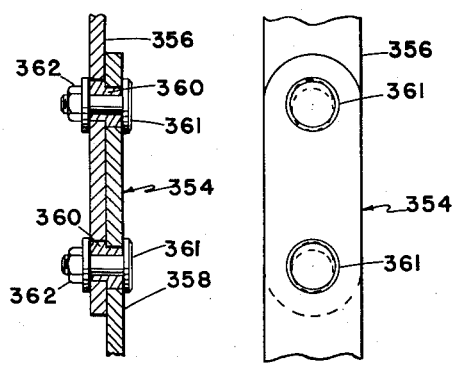
Fig. 11 is an enlarged fragmentary sectional view taken on the line 11—11 of Fig. 1.
Fig. 12 is a side elevation view of the structure illustrated sectionally in Fig. 11.

It has been stated that the wheels 66 and 70 must rotate one-quarter turn to advance the molds one step. This is accomplished by means of a rachet mechanism comprising a drive plate 140 on which are pivotally mounted four pawls 142 spring tensioned by means of springs 144. The pawls 142 are equally spaced around the edge of the drive plate 140 to align and engage with four steps 146 in a rachet disc 148 which is secured to the respective cross shaft 68 or 72. Each drive plate 140 is provided with a radially extended arm 150, said drive plates being pivotally attached to the respective cross shafts 68 and 72 by means of bushes 152 and nuts 154, said bushes also serving to clamp the rachet discs 148 in positions as illustrated in Fig. 7.

The various mold advancing mechanisms are all intermittently actuated by means of a linkage system driven from cranks 156 attached to the shaft 34. The extended arms 150 of the drive plate 140 are interconnected by a transfer bar 158 terminally pivoted thereon, said transfer bar being connected to the crank 156 by means of a rod 160 having a turnbuckle 162 to permit limited adjustment of the length of said rod. The rod 160 passes through a block 164 which is pivotally attached to the end of the crank 156, said rod being resiliently and slidably mounted in said block by means of springs 166 and 168 which are retained by means of nuts 170 threadably engaged with the screw threaded end of the rod 160. The resiliency thus produced is necessarily limited but provides a certain amount of overtravel in the strokes of the mechanism which has been found in practice to prevent jamming of the mechanism which may be caused by wear of the parts or by foreign matter falling into portions of the machine.

The point at which the rod 160 is connected to the transfer bar 158 is also the attachment point for the arm 172 of a bell crank 174 which is secured to a rockshaft 176 transversely pivoted in the sides 10 and 12. The short arm 178 of the bell crank 174 serves to actuate the lift mechanism which will later be described in detail. Also connected to the transfer bar 158 is a rocker arm 180 which is secured to a rockshaft 182 similar to the rockshaft 176. A link 184 is connected to the transfer bar together with the rocker arm 180, said link being connected at its other end to the slide bar 108 actuating the pawls in the upper track. The rockshaft 182 is located at the central point of the rocker arm being pivotally attached to a link 186 which is connected to the slide bar 188 actuating the pawl mechanism in the raised track. From this position a further link 190 is extended to the slide bar 192 actuating the pawl mechanism in the lower track, thus all the pawl mechanisms are interconnected through a common rocker arm. It is not necessary that the rachet mechanism operating the wheels 66 and 70 be duplicated on either side of the machine, each pair of wheels being secured to a common cross shaft, however, the remaining pawl operating mechanism must be duplicated to ensure smooth operation of the device.

It should be noted that the four levers formed by the extended arms 150, the bellcrank 174 and the rocker arm 180 all connected to the transfer bar 158 are of equal length to obtain the correct relationship between the movements of the various mechanisms.

On the forward stroke of the mechanism which is shown completed in Figs. 1 and 5, the molds are advanced one step by the pawls in the upper track, lower track and raised track, while the molds in the curved end portions of the track are advanced by the wheels as previously described, the wheels being rotated one-quarter turn by the pawls 142 engaging the rachet disc 148. On the return stroke of the mechanism, the pawls 142 will slide over the rachet disc 148 and the pawls in the tracks will slide over the respective trunnions 80, the only operations taking place on this return stroke being the lifting action and a pressing action, both of which will later be described, and the filling of the mold now stationary at the filling station.

The molding material, which in this particular case will be concrete, is fed into the machine through a hopper assembly 194 constructed in three sections, namely, a filling station 196, a final screed station 198 and a press station 200. The filling station 196 takes the form of a hopper 202 having a tapered section 204 and a vertical section 206. The sides 208 of the tapered section 204 are extended to form the sides of the final screed station 198 and the press station 200 and are reinforced by side beams 209, the hopper being separated from the final screed station by a partition 210 in which is a rectangular opening 212 provided with a gate 214 which is slidably mounted in guides 216. The gate 214 is vertically adjustable within the guides 216 and is manually controlled by means of a lever 218 pivotally attached to the partition 210 and connected to the gate by means of a slotted hole 220 engaging a pin 222 in said gate. The purpose of the adjustable gate is to allow a limited amount of surplus concrete to pass into the final screed position to ensure complete filling of the mold.

The concrete in the hopper 202 is agitated by means of an impeller 224 to prevent said concrete from clogging or packing in the mechanism. The impeller 224 is secured by means of stays 225 to a vertical shaft 226 rotating in a bearing 228 which is supported by means of bearing supports 230 attached to the sides of the vertical section 206. The bearing is protected by a helical screw 232 also secured to the vertical shaft 226, said helical screw being enclosed in a sleeve 234 and serving to eject any surplus concrete forced upwardly toward the bearing by the impeller 224. The vertical shaft 226 is provided with a gear 236 which is driven by a chain 238 from a gear 240 on a shaft 242 rotating in two bearings 244 and 246 secured to the outer surface of the vertical section 206 and to the side 10 respectively. The lower end of the shaft 242 is provided with a bevel gear 248 engaging with a similar bevel gear 250 on a horizontal shaft 252 rotating in bearings 254 and 256 attached to the side 10. The remaining end of the horizontal shaft 252 is also provided with a bevel gear 258 engaging with a bevel gear 260 mounted on a stub shaft 262 rotating in a bearing 264 attached to the side 10. The stub shaft 262 has a gear 266 which is driven by a chain 268 from a gear 270 mounted on the shaft 34 between the bearing block 36 and the crank 156.

The concrete falling into a mold from the hopper is further agitated by means of a screed 272 to ensure even distribution of the concrete in the mold and to level the top surface of the concrete after filling. The screed 272 comprises two sliding rods 274 having elongated loops 276 at one end through which is passed a rest bar 278. The remaining ends of the sliding rods 274 have loops 280 fitted over lugs 282 and 284 of a guide rod 286 and an oscillating rod 288 respectively which are interconnected by a coupling rod 290. The guide rod 286 slides in a bushing 292 secured in the side of the tapered section 204 while the oscillating rod 288 is extended through a similar bushing 292 and is provided with a flange 294 which serves to retain a spring 296. The outer face of the flange 294 rests against the periphery of an eccentric disc 298 which is secured to the shaft 242 so that rotation of said shaft will produce an oscillating movement of the screed 272. The remainder of the screed 272 comprises a plurality of diagonally opposed screed bars 302 secured at their ends to the sliding rods 274 and bent to hang downwardly to form a grid in close proximity to the upper surface of a mold in the filling position.

During the filling operation the mold is vibrated to ensure even and complete filling of the mold and to eliminate air pockets in the concrete. This is accomplished by a trough 304 having two sides 306 and a base plate 308, the upper edges of the sides 306 resting against the lower surface of the mold 42 as illustrated in Fig. 2. The trough 304 is resiliently supported on two angles 310 by means of springs 312 and is retained by bolts 314 passing through the base plate 308, then through the springs 312 and the angles 310 being locked by nuts 316. The trough, and consequently the mold, is vibrated by an electrical vibrator 318 suspended beneath said trough on a support member 320. The mold is now advanced from the filling station 196 to the final screed station 198 where it is further vibrated by another electrical vibrator 318. As the mold is advanced from the final screed station 198 to the press station 200, the excess concrete is scraped off by the partition 322 dividing those two stations. At the press station 200 the mold is again vibrated by a mechanism similar to that described but at this position the angles 310 must be cut away to provide clearance for the wheels 66 and are reinforced by means of beam members 324.

Figure 15:
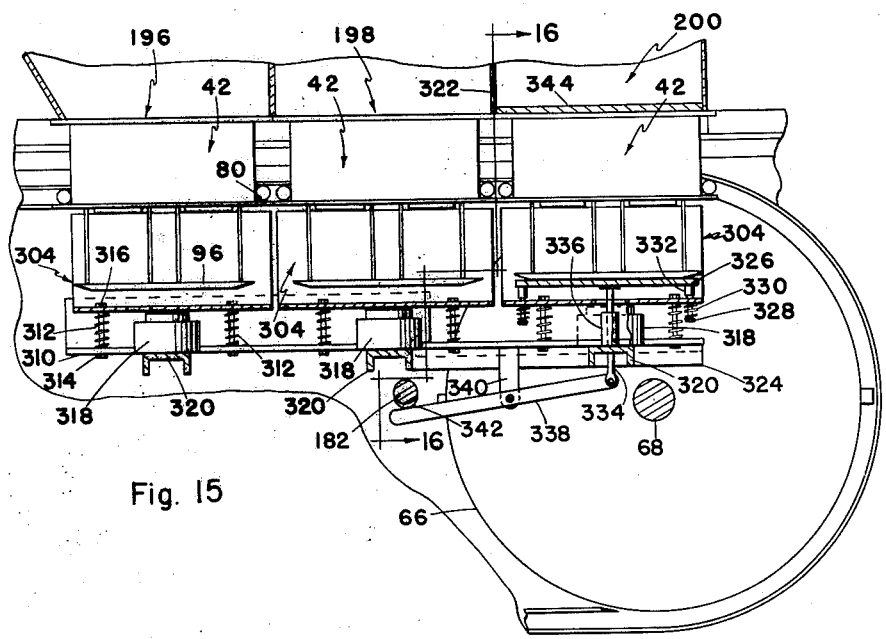
Fig. 15 is an enlarged fragmentary longitudinal sectional view of the vibrating and compacting mechanism omitted from Fig. 6.
Figure 17:
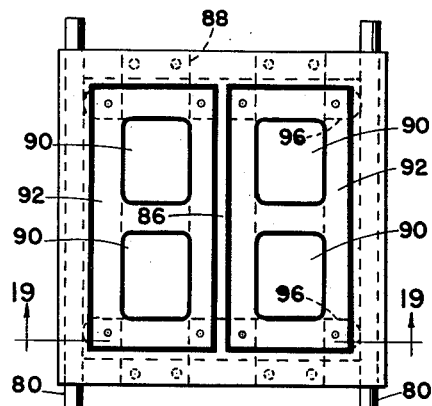
Fig. 17 is a plan view of a mold.
Figure 18:
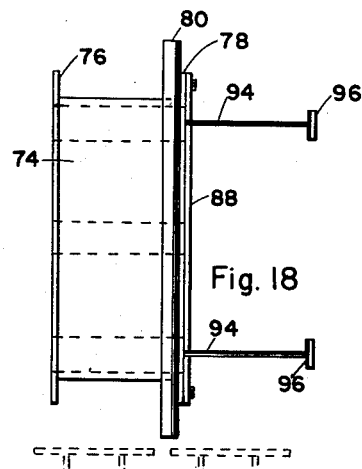
Fig. 18 is a side elevation view of a mold.

At the press station 200 the concrete in the mold 42 is compressed slightly to reduce the water content of the concrete and also to reduce the size of the concrete blocks to allow for the thickness of a layer of mortar used in constructing a wall of such blocks. The compression is accomplished by means of a pressure plate 326 resting against the ejector bars 96 of the mold 42. The pressure plate 326 is provided with four studs 328 passing through the base plate 308 of the trough 304 and is spring tensioned downwardly by springs 330 but is retained in close proximity to the ejector bars 96 by shouldered portions 332. The pressure plate 326 is lifted by push rods 334 attached to the lower surface of said pressure plate, said push rods passing through bearings 336 secured to the support member 320 and being connected to toggles 338 which are pivotally attached to brackets 340 extending downwardly from the beam members 324. The toggles 338 are extended beneath the rockshaft 182 which is provided with two cam lobes 342 arranged so that on the return stroke of the mechanism as previously described, the cam lobes 342 will depress the toggles causing the pressure plate 326 to be lifted so compressing the concrete within the mold against a fixed plate 344 secured within the hopper assembly structure as illustrated in Fig. 15.

The mold 42 is now advanced around the curved end track 48, being inverted in the process, and passes on to the lower track where it is subsequently advanced to the discharge station 346. At this position the trunnions 80 rest on support plates which serve as extensions of the outer rails 60. Behind each support plate is a lifting mechanism comprising a lifting plate 347 hinged to a block 348 which is attached to an exterior lift bar 349 by means of bolts 350 passing through a vertical slot 352 in the respective side 10 or 12. The lift bars 349 are connected to the short arms 178 of the bell cranks 174 by means of adjustable links 354, said adjustable links each comprising an upper portion 356 and a lower portion 358 which are joined by means of eccentric bushes 360 so that the length of the adjustable link may be altered by rotating said eccentric bushes and locked in the required position by means of bolts 361 and nuts 362. The lifting plates 347 are retained in vertical alignment by bolts 364 passing through the lift bars 349 and are tensioned inwardly by springs 366 fitted over said bolts so that the upper edges of said lifting plates are disposed beneath the trunnions 80, the lifting plates having inwardly bent portions 368 to permit outward deflection against the springs 366 on the downward stroke of the mechanism. On the return stroke of the machine the lifting mechanism is raised carrying the mold 42 upwardly until the trunnions 80 are caught and retained by sprung tracks 370 each comprising a track plate 372 having an inwardly bent upper portion 374, the lower edge of said track plate being hinged to a support bracket 376. The track plates 372 are retained in position beneath the trunnions 80 by means of springs 378 fitted over bolts 380 passing through the respective sides 10 and 12. During the lifting operation, the ejector bars strike against a fixed ejector plate 382 vertically disposed above the discharge station, said ejector plate being rigidly braced by angle supports 384. The mold 42 is thus forced upwardly while the ejector plates 92 remain stationary thus discharging the molded concrete blocks 82 onto a pallet 386 positioned below the discharge station.

At this point it should be noted that the mold 98, although producing a block smaller than that produced by the mold 42, has extended legs 100 which project an equal distance from the mold as do the legs 94 of the mold 42. Thus the ejector bars 103 of the mold 98 will contact the fixed ejector plate 382 at the beginning of the lifting operation so that the concrete blocks will be smoothly ejected onto the pallet. Were the legs 100 similar in length to the legs 94, the mold would be lifted some distance above the pallet before the concrete blocks began to emerge thus causing said blocks to fall that distance onto the pallet which would result in damage to the blocks. A further feature of the particular construction of the mold 98 is that the molds of differing internal configurations may be used simultaneously in the machine, the external dimensions of said molds being similar in all cases.

The pallet 386 is one of a plurality of such pallets which are advanced intermittently to coincide with the advancement of the molds 42. The pallets are stored in a magazine 388 formed by the side 10 and two end plates 390, the side 12 being omitted at this position to provide an opening through which the pallets may be loaded into the magazine. The pallets are forced singly from the magazine by a sliding plate 392 which is reciprocated by means of rods 394 connected to the lower end of the link 190, said rods having turnbuckles 396 to permit adjustment of their length. The rods 394 are attached to the sliding plate 392 by pins 398 passing through slots 400 in the sides 10 and 12, said sliding plate being guided by means of skids 402 supported by a bed block 404, said skids forming surfaces along which the pallets 386 may slide with the minimum of friction. A slot 406 formed by the space between the bottom edge of the end plates 390 and the skids 402 prevents the simultaneous passage of more than one pallet so that said pallets are advanced along the skids 402 in a continuous abutting stream.

The pallets carrying the discharged concrete blocks are further advanced along the skids by the pressure of the succeeding pallets until reaching the unloading station 408 from whence they may be removed and stacked where required.

The now empty mold is advanced from the discharge station 346 until the trunnion 80 is engaged by one of the tongues of the wheel 70 which lifts said mold to the upper track, returning the mold to the upright position. At this point the ejector plates 92 will fall to the bottom of the cavities 89 under their own weight, so preparing the mold for the next filling operation.

The operation of this invention will be clearly comprehended from a consideration of the foregoing description of the mechanical details thereof, taken in connection with the drawing and the above recited objects. It will be obvious that all said objects are amply achieved by this invention.

It will also be now evident that this machine will produce better blocks than contemporary machines by reason of the improved ejection process. The ejection is actually a stripping operation with the molded article remaining stationary on the pallet while the mold is lifted therefrom, with consequent decreased likelihood of any distortion or malformation. This ejection or stripping is also accomplished deliberately and smoothly during the time that other molds are being filled at another station. As hereinbefore mentioned the screeding and pressing operations are also accomplished without sacrifice of time, since these operations, like the ejection, are effected simultaneously with the filling operation. Other advantages will occur to those skilled in the art to which this invention appertains.

Further description would appear to be unnecessary.

It is understood that minor variation from the form of

I claim:

1. In a molding machine, a plurality of separate molds, means for intermittently moving said molds in upright disposition along a closed path past a filling station and in inverted disposition past a discharge station with said molds pausing at said stations, means for successively filling molds at said filling station and means for lifting the inverted molds thereby discharging molded articles from said molds at said discharge station, said filling means including a hopper open at both ends through which moldable material may be passed into molds successively and intermittently disposed beneath said hopper, material lifting and agitating means within said hopper to separate the molding material in said molds from the molding material in said hopper, and a horizontally oscillating screen disposed immediately below said agitating means for sifting the molding material, said lifting and agitating means comprising a driven vertical shaft within said hopper, a helical screw fixed on the lower end of said shaft and extending into the lowermost portion of said hopper, a vertically elongated bearing wherein an upper end portion of the shaft is rotatably mounted, a fixed sleeve concentric with said shaft and mounted at the lower end of said bearing between said bearing and said screw, and a second helical screw fixed to said shaft and having a pitch reversed with reference to the first mentioned screw and coacting with said sleeve to prevent entry of moldable material into said bearing.

2. A molding machine comprising a frame including vertical parallel spaced sides, mold-guiding tracks secured to and between said sides and defining a closed path therebetween, a train of separate molds slidably mounted end to end on said tracks, said tracks including an upper track, an interrupted lower track having a raised portion, curved end tracks connecting the ends of the upper track with one end of the lower track and the opposite end of the lower track raised portion, power means for sliding said molds along said tracks including power-driven mold-shifting wheels operatively mounted on said frame adjacent said curved end tracks, mold filling means mounted on the frame immediately above a portion of the upper track, lifting means for successively raising the molds from the lower portion of the lower track to the level of the raised portion thereof so that molded articles are ejected, said power means providing intermittent movement of the train of molds so that the molds are successively at rest for short periods during the filling thereof.

3. A molding machine according to claim 2 and wherein said filling means comprises a filling station including a hopper, agitating means in said hopper, and an oscillatable screed immediately below said agitating means and immediately above said molds, a final screed station including means to vibrate the filled mold, and a pressing station including means for compressing material within the mold.

4. A molding machine according to claim 2 and wherein said wheels have radially extending mold-engaging tongues, and means to extend and to retract said tongues to avoid interference of the tongues with molds moving on the upper and lower tracks.

5. A molding machine according to claim 2 and wherein said power means for sliding the molds includes trunnions on said molds rachet means successively engaging said trunnions and an interconnecting lever linkage synchronizing the operation of said rachet means with said wheels.

6. A molding machine according to claim 2 and including a pallet magazine, means for feeding pallets individually beneath the filled molds as they are inverted in traversing one curved end track, said molds having false bottoms, means for holding said false bottoms stationary while said lifting means raises the inverted molds, whereby the molded articles are ejected onto said pallets.

7. A molding machine according to claim 2 and wherein said upper track and the lower portion of said lower track are horizontal and the curved end tracks are single outer rails of semicircular form, the upper rail of said upper track and the lower rail of said lower track portion being continuous with said end track, said wheels constituting inner rails for said end tracks.

8. A molding machine according to claim 7 and wherein the distance travelled by the molds on the upper and lower track in each intermittent rectilinear movement thereof is substantially equal to the length of one of the molds, said wheels rotating with circumferential speeds slightly in excess of said rectilinear movement to prevent jamming of the molds.

9. A molding machine according to claim 2 and including rachet drive means in said wheels, an eccentric operatively connected to said power means, a transfer bar reciprocated by said eccentric and connected with said rachet drive means of the wheels, and other rachet means operatively connecting said bar with said molds while the same are traversing the upper and lower tracks, whereby the complete train of molds advances intermittently coinciding with the movement of said transfer bar in one direction.

References Cited in the file of this patent

UNITED STATES PATENTS

| Number | Name | Date |
|---|---|---|
| 482,252 | Jacobs | Sept. 6, 1892 |
| 761,255 | Rowell et al. | May 31, 1904 |
| 805,914 | Horr | Nov. 28, 1905 |
| 949,886 | Dunton | Feb. 22, 1910 |
| 1,001,952 | Henley | Aug. 29, 1911 |
| 1,184,648 | Horton | May 23, 1916 |
| 1,280,575 | Stehm | Oct. 1, 1918 |
| 1,534,361 | Craig | Apr. 21, 1925 |
| 1,814,172 | Martinet | July 14, 1931 |
| 2,421,572 | Miller | June 3, 1947 |
| 2,427,044 | Burns | Sept. 9, 1947 |
| 2,477,266 | Phillips et al. | July 26, 1949 |
| 2,494,212 | Spriggs et al. | Jan. 10, 1950 |
| 2,531,574 | Lang | Nov. 28, 1950 |
| 2,615,228 | Regan | Oct. 28, 1952 |